(12) United States Patent
Yang

(10) Patent No.: US 11,607,714 B2
(45) Date of Patent: Mar. 21, 2023

(54) DEVICE FOR CLEANING GLASS SUBSTRATE AND METHOD OF CLEANING GLASS SUBSTRATE

(71) Applicant: TCL China Star Optoelectronics Technology Co., Ltd., Shenzhen (CN)

(72) Inventor: Wei Yang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/618,147

(22) PCT Filed: Jul. 26, 2019

(86) PCT No.: PCT/CN2019/097881
§ 371 (c)(1),
(2) Date: Dec. 1, 2019

(87) PCT Pub. No.: WO2020/252852
PCT Pub. Date: Dec. 24, 2020

(65) Prior Publication Data
US 2022/0168782 A1   Jun. 2, 2022

(30) Foreign Application Priority Data

Jun. 17, 2019 (CN) .......................... 201910520408.4

(51) Int. Cl.
*B08B 11/04* (2006.01)
*B08B 3/02* (2006.01)

(52) U.S. Cl.
CPC .............. *B08B 3/022* (2013.01); *B08B 11/04* (2013.01)

(58) Field of Classification Search
None
See application file for complete search history.

(56) References Cited

U.S. PATENT DOCUMENTS

| 5,425,995 | A | 6/1995 | Unruh |
| 2013/0114174 | A1 | 5/2013 | Hamby |

(Continued)

FOREIGN PATENT DOCUMENTS

| CN | 104858193 A | * | 8/2015 | ............. B08B 15/00 |
| CN | 205619984 U | * | 10/2016 | |
| CN | 108873603 A | * | 11/2018 | ............... G03F 1/82 |

OTHER PUBLICATIONS

Google Patents translation of CN 108873603 retrieved from https://patents.google.com/patent/CN108873603A/en?oq=108873603 on Aug. 22, 2022 (Year: 2022).*

(Continued)

*Primary Examiner* — Eric W Golightly
(74) *Attorney, Agent, or Firm* — PV IP PC; Wei Te Chung; Ude Lu

(57) ABSTRACT

The disclosure provides a device for cleaning a glass substrate and a method of cleaning the glass substrate. The device for cleaning the glass substrate includes a body; a conveying device including a carrying unit for carrying the glass substrate and moving the glass substrate into the body; a cleaning unit disposed in a fixed frame, wherein the cleaning unit includes a nozzle configured to be extended or retracted correspondingly to the glass substrate; and a water pipe unit disposed under the body, wherein the water pipe unit is configured to raise an internal humidity of the body and reduce electrostatic discharge effects caused by the glass substrate entering the body.

6 Claims, 5 Drawing Sheets

(56) References Cited

U.S. PATENT DOCUMENTS

2016/0365371 A1   12/2016   Yao
2020/0144081 A1   5/2020    Tsujikawa et al.

OTHER PUBLICATIONS

Google Patents translation of CN 104858193 retrieved from https://patents.google.com/patent/CN104858193A/en?oq=CN+104858193+ on Aug. 23, 2022 (Year: 2022).*

Google Patents translation of CN 205619984 retrieved from https://patents.google.com/patent/CN205619984U/en?oq=CN+205619984 on Aug. 23, 2022 (Year: 2022).*

* cited by examiner

DEVICE FOR CLEANING GLASS SUBSTRATE AND METHOD OF CLEANING GLASS SUBSTRATE

FIELD

The present disclosure relates to the display field and, more particularly, relates to a device for cleaning a glass substrate and a method of cleaning the glass substrate.

BACKGROUND

In the field of display technology, cathode ray tube (CTR) display devices are gradually replaced by liquid crystal displays (LCDs) and organic light-emitting diode (OLED) display devices, which are widely used in liquid crystal televisions, mobile phones, personal digital assistants, digital cameras, computer screens, laptop screens, and so on.

Regarding technical problems: In a conventional process of manufacturing a glass substrate, electrostatic discharge (ESD) occurs when glass substrates are moved into a cleaner containing 0.4% tetramethylammonium hydroxide (TMAH). An ESD detection is a repeating operation, which wastes materials and makes apparatuses unable to work. However, if the ESD is not detected in time, the glass substrates will be damaged, causing defects and poor quality of products. Furthermore, apparatuses need to be shut down for a long time when the ESD is being dealt with, and a process of dealing with the ESD needs to be repeated many times because a success rate of dealing with the ESD in all glass substrates at the same time is low.

SUMMARY

Consequently, objectives of the present disclosure are to provide a device for cleaning a glass substrate and a method of cleaning the glass substrate to improve the above problems.

To solve the above technical problems, one objective of the present disclosure is to provide a device for cleaning a glass substrate, including a body; a conveying device including a carrying unit for carrying a glass substrate and moving the glass substrate into the body; a cleaning unit disposed in a fixed frame, wherein the cleaning unit includes a nozzle configured to be extended or retracted correspondingly to the glass substrate; and a water pipe unit disposed under the body, wherein the water pipe unit is configured to raise the internal humidity of the body and reduce electrostatic discharge effects caused by the fact that the glass substrate enters the body.

The other objective of the present disclosure is to provide a method of cleaning the glass substrate, including: providing a body; providing a conveying device including a carrying unit for carrying a glass substrate and moving the glass substrate into the body; providing a cleaning unit disposed in a fixed frame, wherein the cleaning unit includes a nozzle configured to be extended or retracted correspondingly to the glass substrate; and providing a water pipe unit disposed under the body, wherein the water pipe unit is configured to raise the internal humidity of the body and reduce electrostatic discharge effects caused by the fact that the glass substrate enters the body.

The following technical solutions are used to realize the objectives of the present disclosure and solve the technical problems.

In one embodiment of the present disclosure, the water pipe unit further includes a first water pipe and a second water pipe which are configured to individually raise the internal humidity of the body.

In one embodiment of the present disclosure, the first water pipe and the second water pipe are connected to each other in parallel.

In one embodiment of the present disclosure, both the first water pipe and the second water pipe include a water intake and a water outlet which are configured to control inputs and outputs of water to adjust the internal humidity of the body.

In one embodiment of the present disclosure, material of the first water pipe is plastic.

In one embodiment of the present disclosure, material of the second water pipe is plastic.

In one embodiment of the present disclosure, in the method, the water pipe unit further includes a first water pipe and a second water pipe which are configured to individually raise the internal humidity of the body.

In one embodiment of the present disclosure, in the method, the first water pipe and the second water pipe are connected to each other in parallel.

In one embodiment of the present disclosure, in the method, both the first water pipe and the second water pipe include a water intake and a water outlet which are configured to control inputs and outputs of water to adjust the internal humidity of the body.

By a device for cleaning a glass substrate and a method of cleaning the glass substrate provided by the present disclosure, an internal humidity of an entire cleaning chamber is improved, and effects of ESD are reduced as well.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION

Figure 1:
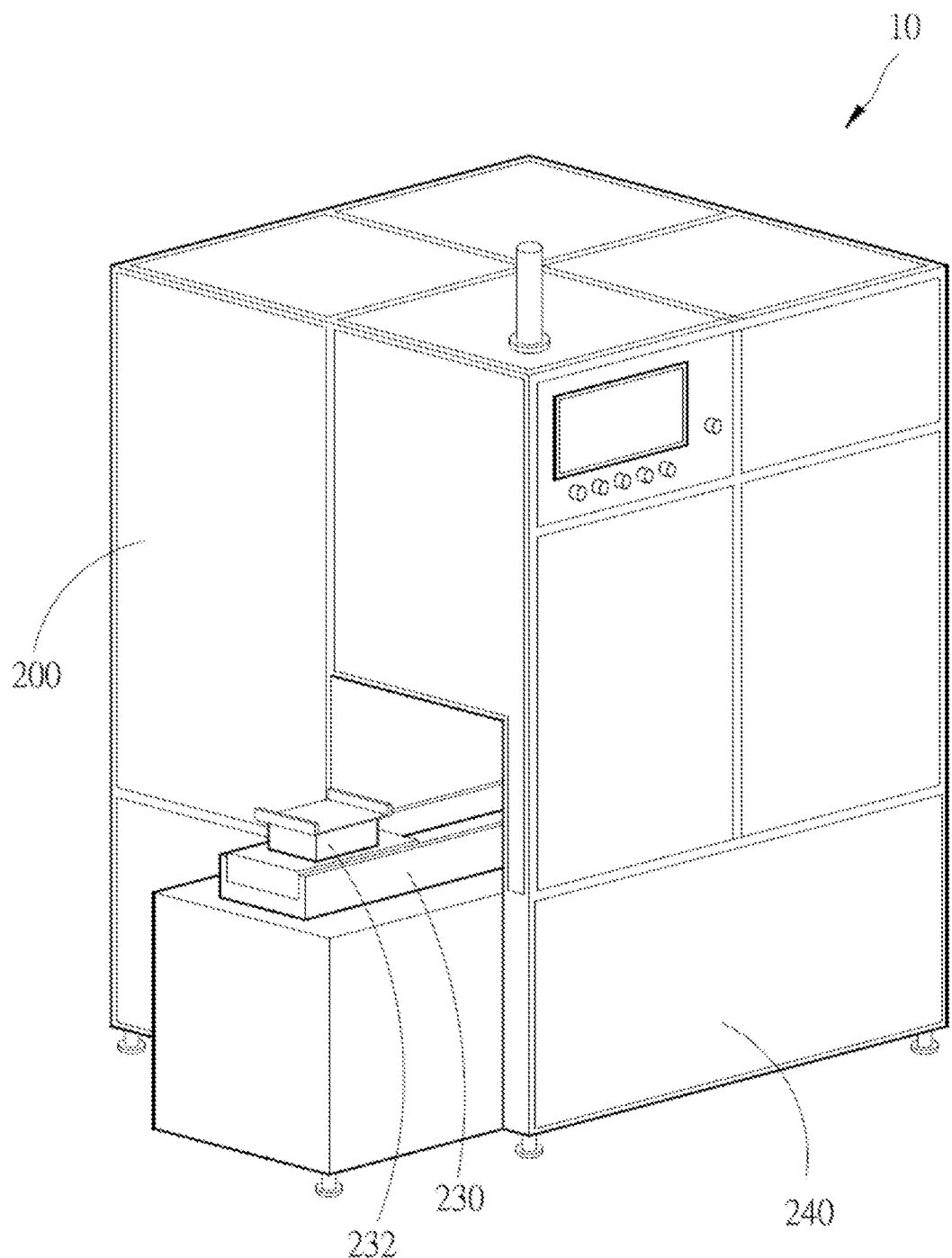
FIG. 1 is a schematic diagram showing a device for cleaning a glass substrate according to an embodiment of the present disclosure.

The following description of the various embodiments is provided with reference to the accompanying drawings. It should be understood that terms such as "upper", "lower", "front", "rear", "left", "right", "inside", "outside," "lateral", as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure.

The specific embodiments described with reference to the attached drawings are all exemplary but not limited. In the drawings, the identical or similar reference numerals constantly denote the identical or similar elements. Furthermore, for the purpose of understanding and ease of description, the size and thickness of each component shown in the drawings are arbitrarily shown, but the present disclosure is not limited thereto.

In the drawings, the thicknesses of layers, films, panels, regions, etc. are exaggerated for clarity. In the drawings, the thicknesses of some layers and regions are exaggerated for the purpose of understanding and ease of description. It should be noted, components such as a layer, a film, a region, or a substrate "on" another component may include an embodiment that the layer, the film, the region, or the substrate is right "on" the another component, or means that there is an intermediate between two components.

Furthermore, in the description of the present disclosure, unless specified described as the opposite, term "include" is to be understood as being inclusive of the component, and does not exclude any other components. In addition, in the description of the present disclosure, term "a component is disposed on another component" means that the component is on or under the another component, but is not limited to that the component is on the top of the another component based on gravity-based direction.

In order to further illustrate the technical means and effects used to achieve the intended purpose of the present disclosure, specific embodiments, structures, features, and effects of the device for cleaning a glass substrate and the method of cleaning the glass substrate provided by the present disclosure are described in detail below in conjunction with drawings and specific embodiments.

Figure 2:
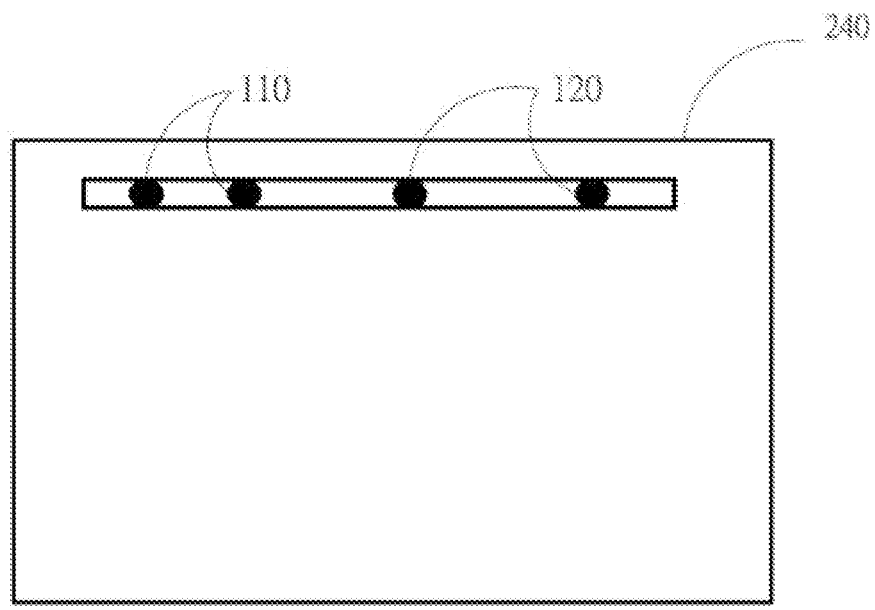
FIG. 2 is a schematic view showing a water pipe unit disposed under a body of a device for cleaning a glass substrate according to an embodiment of the present disclosure.
Figure 3:
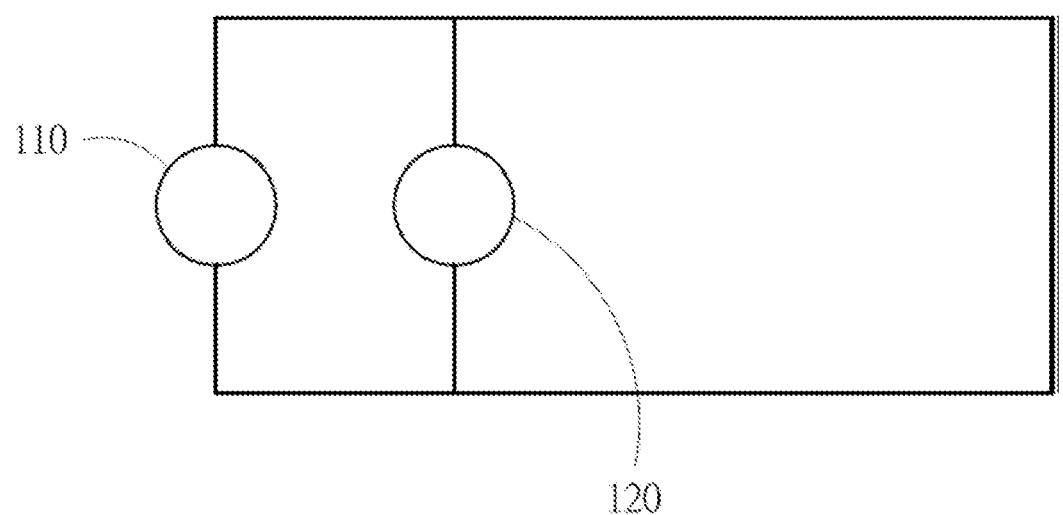
FIG. 3 is a schematic view showing a first water pipe and a second water pipe which are connected to each other in parallel according to an embodiment of the present disclosure.
Figure 4:
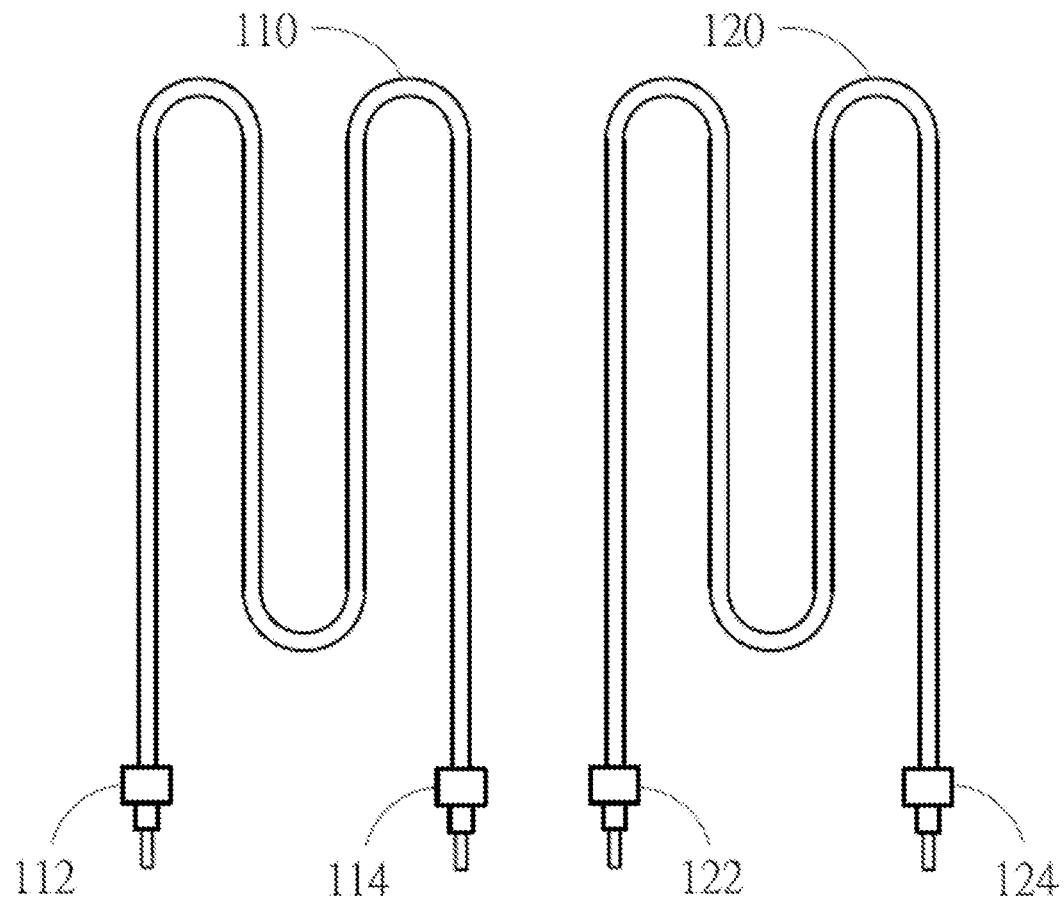
FIG. 4 is a schematic view showing a first water pipe and a second water pipe which both include a water intake and a water outlet according to an embodiment of the present disclosure.

FIG. 1 is a schematic diagram showing a device for cleaning a glass substrate according to an embodiment of the present disclosure. FIG. 2 is a schematic view showing a water pipe unit disposed under a body of a device for cleaning a glass substrate according to an embodiment of the present disclosure. FIG. 3 is a schematic view showing a first water pipe and a second water pipe which are connected to each other in parallel according to an embodiment of the present disclosure. FIG. 4 is a schematic view showing a first water pipe and a second water pipe which both include a water intake and a water outlet according to an embodiment of the present disclosure. Referring to FIG. 1, one embodiment of the present disclosure provides a device 10 for cleaning a glass substrate, including a body 200; a conveying device 230 including a carrying unit 232 for carrying the glass substrate and moving the glass substrate into the body 200; a cleaning unit (not shown) disposed in a fixed frame, wherein the cleaning unit includes a nozzle configured to be extended or retracted correspondingly to the glass substrate; and a water pipe unit 240 disposed under the body 200, wherein the water pipe unit 240 is configured to raise an internal humidity of the body 200 and reduce electrostatic discharge (ESD) effects caused by the glass substrate entering the body 200.

Referring to FIG. 1 and FIG. 2, in one embodiment of the present disclosure, the water pipe unit 240 further includes a first water pipe 110 and a second water pipe 120 which are configured to individually raise the internal humidity of the body 200.

Referring to FIG. 3, in one embodiment of the present disclosure, the first water pipe 110 and the second water pipe 120 are connected to each other in parallel.

Referring to FIG. 1 and FIG. 4, in one embodiment of the present disclosure, the first water pipe 110 includes a water intake 112 and a water outlet 114, and the second water pipe 120 includes a water intake 122 and a water outlet 124. The water intake 112, the water outlet 114, the water intake 122, and the water outlet 124 are configured to control inputs and outputs of water to adjust the internal humidity of the body 200.

Referring to FIG. 4, in one embodiment of the present disclosure, a material of the first water pipe 110 is plastic.

Referring to FIG. 4, in one embodiment of the present disclosure, a material of the second water pipe 120 is plastic.

Figure 5:
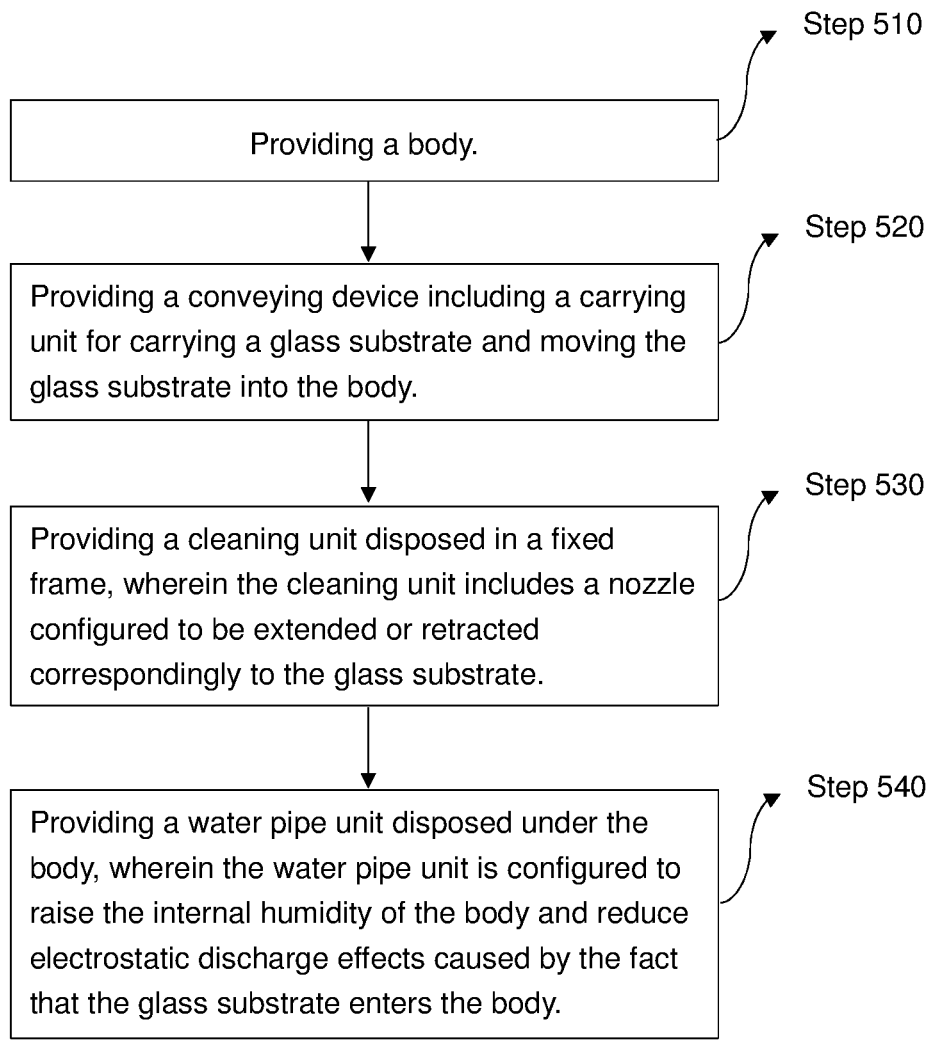
FIG. 5 is a flowchart showing a method of cleaning a glass substrate.

FIG. 5 is a flowchart showing a method of cleaning a glass substrate. Referring to FIG. 1 and FIG. 5, one embodiment of the present disclosure provides the method of cleaning the glass substrate, including: providing a body 200; providing a conveying device 230 including a carrying unit 232 for carrying the glass substrate and moving the glass substrate into the body 200; providing a cleaning unit (not shown) disposed in a fixed frame, wherein the cleaning unit includes a nozzle configured to be extended or retracted correspondingly to the glass substrate; and providing a water pipe unit 240 disposed under the body 200, wherein the water pipe unit 240 is configured to raise an internal humidity of the body 200 and reduce ESD effects caused by the glass substrate entering the body 200.

Referring to FIG. 1 and FIG. 2, in the method of cleaning the glass substrate provided by one embodiment of the present disclosure, the water pipe unit 240 further includes a first water pipe 110 and a second water pipe 120 which are configured to individually raise the internal humidity of the body 200.

Referring to FIG. 3, in the method of cleaning the glass substrate provided by one embodiment of the present disclosure, the first water pipe 110 and the second water pipe 120 are connected to each other in parallel.

Referring to FIG. 1 and FIG. 4, in the method of cleaning the glass substrate provided by one embodiment of the present disclosure, the first water pipe 110 includes a water intake 112 and a water outlet 114, and the second water pipe 120 includes a water intake 122 and a water outlet 124. The water intake 112, the water outlet 114, the water intake 122, and the water outlet 124 are configured to control inputs and outputs of water to adjust the internal humidity of the body 200.

Referring to FIG. 5, in step 510, the present embodiment provides a body.

Referring to FIG. 5, in step 520, the present embodiment provides a conveying device including a carrying unit for carrying the glass substrate and moving the glass substrate into the body.

Referring to FIG. 5, in step 530, the present disclosure provides a cleaning unit disposed in a fixed frame, wherein the cleaning unit includes a nozzle configured to be extended or retracted correspondingly to the glass substrate.

Referring to FIG. 5, in step 540, the present disclosure provides a water pipe unit disposed under the body, wherein the water pipe unit is configured to raise the internal humidity of the body and reduce electrostatic discharge effects caused by the glass substrate entering the body.

By the device for cleaning a glass substrate and a method of cleaning the glass substrate provided by the present disclosure, an internal humidity of a cleaning chamber is improved, and effects of ESD are reduced.

Term "in one embodiment" is repeatedly used, and the term generally does not refer to the same embodiment; however, it can also refer to the same embodiment. Terms such as "including" and "having" are synonymous, unless the context is intended to mean otherwise.

The above embodiments are only examples and are not intended to limit the present disclosure. Although the present disclosure has been described with specific embodiments thereof, the specific embodiments are not intended to limit the present disclosure. Many changes and modifications to the described embodiment can be carried out by those skilled in the art without departing from the technical solutions of the disclosure, which fall with the scope of the technical solutions of the present invention.

The present disclosure can be manufactured and used in the industry, so it possesses industrial practicability.

What is claimed is:

1. A device for cleaning a glass substrate, comprising:
    a body;
    a conveying device comprising a carrying unit for carrying the glass substrate and moving the glass substrate into the body;
    a cleaning unit disposed in a fixed frame, wherein the cleaning unit comprises a nozzle configured to be extended or retracted correspondingly to the glass substrate; and
    a water pipe unit disposed under the body, wherein the water pipe unit is configured to raise an internal humidity of the body and reduce electrostatic discharge effects caused by the glass substrate entering the body;
    wherein the water pipe unit comprises a first water pipe and a second water pipe which are configured to individually raise the internal humidity of the body, and the first water pipe and the second water pipe are connected to each other in parallel.

2. The device for cleaning the glass substrate of claim 1, wherein both the first water pipe and the second water pipe comprise a water intake and a water outlet which are configured to control inputs and outputs of water to adjust the internal humidity of the body.

3. The device for cleaning the glass substrate of claim 1, wherein a material of the first water pipe is plastic.

4. The device for cleaning the glass substrate of claim 1, wherein a material of the second water pipe is plastic.

5. A method of cleaning a glass substrate, comprising:
    providing a body;
    providing a conveying device comprising a carrying unit for carrying the glass substrate and moving the glass substrate into the body;
    providing a cleaning unit disposed in a fixed frame, wherein the cleaning unit comprises a nozzle configured to be extended or retracted correspondingly to the glass substrate; and
    providing a water pipe unit disposed under the body, wherein the water pipe unit is configured to raise an internal humidity of the body and reduce electrostatic discharge effects caused by the glass substrate entering the body;
    wherein the water pipe unit comprises a first water pipe and a second water pipe which are configured to individually raise the internal humidity of the body, and the first water pipe and the second water pipe are connected to each other in parallel.

6. The method of claim 5, wherein both the first water pipe and the second water pipe comprise a water intake and a water outlet which are configured to control inputs and outputs of water to adjust the internal humidity of the body.

* * * * *